United States Patent
Ortiz et al.

(10) Patent No.: US 8,501,898 B2
(45) Date of Patent: Aug. 6, 2013

(54) METHOD OF FORMING A POLYAMIDE

(75) Inventors: Cesar G. Ortiz, Pearland, TX (US);
William E. Grant, Angelton, TX (US)

(73) Assignee: BASF SE, Ludwigshafen (DE)

( * ) Notice: Subject to any disclaimer, the term of this patent is extended or adjusted under 35 U.S.C. 154(b) by 125 days.

(21) Appl. No.: 13/025,795

(22) Filed: Feb. 11, 2011

(65) Prior Publication Data

US 2011/0196093 A1  Aug. 11, 2011

Related U.S. Application Data

(60) Provisional application No. 61/303,405, filed on Feb. 11, 2010.

(51) Int. Cl.
*C08G 69/32* (2006.01)

(52) U.S. Cl.
USPC ...... 528/310; 264/211.22; 428/364; 525/166; 525/178; 525/389

(58) Field of Classification Search
USPC .............. 264/211.22; 428/364; 525/166, 178, 525/389; 528/310
See application file for complete search history.

(56) References Cited

U.S. PATENT DOCUMENTS

| | | | |
|---|---|---|---|
| 4,783,511 A * | 11/1988 | Schmid ..................... | 525/431 |
| 5,562,871 A | 10/1996 | Hoyt et al. | |
| 6,117,550 A | 9/2000 | Studholme | |
| 6,133,382 A | 10/2000 | Studholme | |
| 6,334,877 B1 | 1/2002 | Studholme | |
| 6,420,044 B1 | 7/2002 | Studholme | |
| 6,433,107 B1 | 8/2002 | Studholme | |
| 6,479,620 B1 * | 11/2002 | Fergusson et al. ............ | 528/310 |
| 6,537,475 B1 | 3/2003 | Studholme | |
| 6,589,466 B2 | 7/2003 | Studholme | |
| 6,635,346 B2 | 10/2003 | Studholme | |
| 6,680,018 B2 | 1/2004 | Studholme | |
| 6,753,385 B2 | 6/2004 | Studholme | |
| 7,115,224 B2 | 10/2006 | Studholme | |
| 2002/0020026 A1 | 2/2002 | Studholme | |
| 2002/0185775 A1 | 12/2002 | Studholme | |
| 2003/0138625 A1 | 7/2003 | Studholme | |
| 2004/0154110 A1 | 8/2004 | Studholme | |

FOREIGN PATENT DOCUMENTS

WO  WO 0218492 A1  3/2002

* cited by examiner

*Primary Examiner* — Gregory Listvoyb
(74) *Attorney, Agent, or Firm* — Howard & Howard Attorneys PLLC

(57) ABSTRACT

A method polymerizes a monomer to form a polyamide having a reagent incorporated therein. In the method, a masterbatch is formed that includes the reagent. The masterbatch and the monomer are introduced into a reactor, and the monomer is polymerized in the presence of the reagent to form the polyamide having the reagent incorporated therein. The monomer may be a caprolactam monomer that may be polymerized in a VK tube reactor to form polyamide 6 having at least one free acid site. The reagent may be present in an amount of from 1 to 10 parts by weight per 100 parts by weight of the masterbatch. Additionally, the masterbatch and caprolactam may be introduced into the top of the VK tube reactor.

25 Claims, No Drawings

METHOD OF FORMING A POLYAMIDE

CROSS-REFERENCE TO RELATED APPLICATIONS

The subject patent application claims priority to and all the benefits of U.S. Provisional Patent Application Ser. No. 61/303,405, which was filed on Feb. 11, 2010, the entire specification of which is expressly incorporated herein by reference.

FIELD OF THE INVENTION

The present invention generally relates to a method of forming a polyamide having a reagent incorporated therein. More specifically, the method includes the step of forming the polyamide by polymerizing a monomer in the presence of the reagent.

DESCRIPTION OF THE RELATED ART

Polyamides are used in a variety of applications and typically include additives that are used to influence physical properties such as viscosity, strength, fire resistance, stain resistance, flowability, color, texture, and the like. Many of these additives are, in themselves, difficult to work with for a variety of reasons such as volatility, hygroscopic tendencies, sensitivity to light and subsequent degradation, and viscosity. Accordingly, many of these additives are not efficiently used on a commercial scale thus resulting in production of polyamides with less than ideal physical properties.

In one application, polyamides are used to form fibers in textiles such as carpets and rugs. However, these fibers typically suffer from a lack of stain resistance due to chemical interactions of acid sites in the polyamides and complementary sites in staining compositions. These chemical interactions typically set stains and make removal particularly difficult. Accordingly, it is known in the art to add stain blocking agents to the polyamides to increase stain resistance through a reduction in the chemical interactions thereby making removal of the stains easier and more efficient.

Well known stain blocking agents that are commonly added to polyamides are sulfoisophthalic acids, sulfobenzoic acids, and sulfonic acids. However, these stain blocking agents tend to be hygroscopic, tend to agglomerate when used on a commercial scale, and can clog industrial reactors thereby leading to production inefficiencies, cost increases, and formation of inferior fibers. Accordingly, numerous different approaches have been developed to increase the applicability of such stain blocking agents. Yet, each known approach still suffers from production inefficiencies and forms fibers that can still be improved.

A first approach adds powdered stain blocking agents to water to form easy to handle solutions. The solutions are then added directly to polyamide reactors to incorporate the stain blocking agents into the polyamides. However, it is well known in the art that the presence of water during formation of polyamides (e.g. formation of polyamide 6) interferes with polymerization reactions and causes one of two outcomes. A first outcome includes formation of polyamides with insufficient physical properties, such as relative viscosity. A second outcome results in decreased speed of polyamide formation. Although the second outcomes allows for polyamides to be formed with sufficient physical properties, the decreased speed of formation is commercially undesirable and greatly increases production costs.

A second approach adds powdered stain blocking agents directly to polyamide reactors to incorporate the stain blocking agents into the polyamides thereby providing stain resistance to fibers formed from the polyamides. However, many of the stain blocking agents are hydroscopic and have a tendency to agglomerate before they are added to the polyamide reactors. Accordingly, this approach typically leads to inconsistent addition of the stain blocking agents, clogging of supply pipes, and non-homogenous distribution of the stain blocking agents in the polyamides. In addition, the stain blocking agents tend to have higher melt viscosities than the polyamides for equivalent relative solution viscosities thereby limiting an extent of polymerization that can occur in the polyamide reactors. Thus, presence of the stain blocking agents tends to hinder rates of polyamide discharge from the reactors and tends to cause excessive foaming in the reactors resulting in poor agitation and non-uniformity of the polyamides.

A third approach sprays a solution of stain blocking agents onto polyamide fibers to form a topcoat on the fibers. This approach also suffers from agglomeration and hygroscopicity of the stain blocking agents which tends to clog spray equipment leading to incomplete spray coverage and inconsistent results. In addition, the topcoats are degraded and eventually removed from the polyamide fibers during use and cleaning with water, detergents, and alkaline cleaning agents. Moreover, sulfonated stain blocking agents, such as those described above, typically breakdown when exposed to light, oxides of nitrogen, and bleach, thus reducing the stain resistance of the polyamide fibers over time.

A fourth approach compounds the stain blocking agents with the polyamides to physically distribute the stain blocking agents in polyamide melts. The stain blocking agents are compounded with the polyamides in melt extruders at temperatures above the melting points of the polyamides to form pellets of polyamides having the stain blocking agents distributed therein. However, due to short residence times in the melt extruders, many stain blocking agents are typically not well distributed within many polyamides thus leading to less than optimal stain resistance and inconsistent product formation. In addition, many stain blocking agents tend to agglomerate and clog filters that are attached to the melt extruders, thus complicating production processes and increasing production times.

One example of this fourth approach is described in U.S. Pat. No. 6,861,480 and its related family members. The '480 patent describes imparting stain resistance to polyamide fibers by compounding stain blocking agents with polyamides through use of melt extruders. The stain blocking agents are compounded with the polyamides subsequent to polymerization, i.e., after the polyamides are formed and downstream from a polyamide reactor. The '480 patent also describes how this compounding method specifically avoids copolymerizing sulfonated stain blocking agents with the polyamides and avoids the disadvantages associated therewith. As described above, because the stain blocking agents and the polyamides have short residence times within the extruders (seconds to minutes), the stain blocking agents are typically not effectively dispersed within the polyamides, thus leading to inferior stain resistance of the resulting fibers. This method is designed to avoid and preferably eliminate copolymerization of the stain blocking agents and polyamide 6. Accordingly, the stain blocking agents are not bonded to the polyamide 6 or effectively incorporated into a polymer lattice or matrix. As a result, the stain blocking agents have a tendency to migrate through the polyamide 6 resulting in a lack of homogeneity which leads to inconsistent stain resistance results. In addition, the stain blocking agents on or near the surface of the fibers are easily removed through cleaning and general use, thus greatly reducing the stain resistance of the fibers over time. Accordingly, there remains an opportunity to develop an improved method of forming polyamides that have enhanced physical properties, such as stain resistance. There also remains an opportunity to develop superior products from the polyamides formed from this method.

SUMMARY OF THE INVENTION AND ADVANTAGES

The instant invention provides a method of polymerizing a monomer to form a polyamide having a reagent incorporated therein. The method includes the steps of forming a masterbatch including the reagent, introducing the masterbatch into a reactor, and introducing the monomer into the reactor. The method also includes the step of forming the polyamide in the reactor by polymerizing the monomer in the presence of the reagent.

This method allows reagents (e.g. hard to handle reagents) to be efficiently and effectively incorporated into polyamides while minimizing agglomeration of the reagents, clogging of reactors, and foaming in the reactors. These benefits are thought to be due to similarities in the melt viscosity of the polyamide formed in this invention and the melt viscosity of the masterbatch based upon equivalent relative solution viscosities for both the polyamide and the masterbatch. Accordingly, production inefficiencies, costs, and formation of inferior polyamides are minimized. In addition, this method reduces any minimization in rates of polymerization in, and discharge from, reactors that result from interactions of certain reagents and monomers, also due to the similarities in melt viscosities. Still further, this method maximizes homogeneous dispersion of the reagent in the polyamide such that the polyamide has increased uniformity and consistency.

DETAILED DESCRIPTION OF THE INVENTION

The present invention provides a method of polymerizing a monomer to form a polyamide having a reagent incorporated therein. The monomer may be any compound or molecule known in the art capable of undergoing polymerization to form the polyamide. Thus, the monomer may include the polymerization product of two different compounds, so long as the polymerization product itself is capable of undergoing further polymerization to form the polyamide of this invention.

In one embodiment, the monomer is selected from the group of caprolactam, 4-aminobutyric acid, 7-aminoheptanoic acid, 8-aminooctanoic acid, 9-aminononanoic acid, 10-aminodecanoic acid, 11-aminoundecanoic acid, 12-aminododecanoic acid, hexamethylene sebacamide, heptamethylene pimelamide, octamethylene suberamide, hexamethylene azelamide, nonamethylene azelamide, decamethylene azelamide, tetramethylenediamine-co-oxalic acid, n-dodecanedioic acid, hexamethylenediamine, dodecamethylenediamine, trimethylene adipamide, tetramethylenediamine-co-isophthalic acid, hexamethylene isophthalamide, hexamethyleneterephthalamide, 2,2,2-trimethylhexamethylene terephthalamide, m-xylylene adipamide, p-xylylene adipamide, hexamethylene terephthalamide, dodecamethylene terephthalamide, isomers thereof, and combinations thereof. In another embodiment, the monomer is selected from the group of hexamethylene diamine, adipic acid, caprolactam, and combinations thereof. Typically, the monomer is further defined as caprolactam, i.e., a caprolactam monomer.

The monomer of this invention is polymerized to form the polyamide. The polyamide typically includes a dimer, trimer, tetramer, or polymer formed from reaction of at least two monomers, as described above. Although the polyamide of this invention may be any known in the art, the polyamide is typically further defined as a polymer that is linked together through peptide bonds and that is formed from a polymerization reaction of amide monomers. The polyamide may be a homopolymer (e.g. nylon 6), a co-polymer (e.g. nylon 6,6), a terpolymer (e.g. nylon 6/66), or any other higher polymer that is formed from more than three or more different monomers. In one embodiment, the polyamide is formed from a condensation reaction of a first monomer having an amino group and a second monomer having a carboxyl group or acid chloride group. Alternatively, the polyamide may be formed from a condensation reaction of two molecules of the first monomer wherein the first monomer has both an amino group and a carboxyl group or acid chloride group. In still another embodiment, the first monomer and the second monomer are both bifunctional wherein one of the two monomers has two amino groups and the other of the two monomers has two carboxyl groups, two acid chloride groups, or one carboxyl group and one acid chloride group.

Typically, the polyamide is selected from the group of nylons, aramids, proteins, metal poly(aspartates) such as sodium poly(aspartate), and combinations thereof. As is well known in the art, nylons are condensation copolymers typically formed by reacting diamines and dicarboxylic acids to form peptide bonds. In one embodiment, the nylon is further defined as having less than 85% of amide-linkages attached directly (—CO—NH—) to two aliphatic groups. Aramids, also known as aromatic polyamides, are typically formed by reacting amines and carboxylic acid halides. In one embodiment, the aramid is further defined as having at least 85% of amide linkages (—CO—NH—) attached directly to two aromatic rings. The aramid may be any known in the art but is typically further defined as an AABB polymer, such as Nomex®, Kevlar®, Twaron® and/or New Star. As is well known in the art, Nomex® and New Star include predominantly meta-linkages and are typically further defined as poly-metaphenylene isophthalamides. Kevlar® and Twaron® are both para-phenylene terephthalamides (PPTA), the simplest form of an AABB para-polyaramide. PPTA is a product of p-phenylene diamine (PPD) and terephthaloyl dichloride (TDC or TCl). Alternatively, the aramid may be further defined as the reaction product of PPD, 3,4'-diaminodiphenylether, and terephthaloyl chloride (TCl). Proteins are organic compounds including amino acids arranged in a linear chain and joined together by peptide bonds between carboxyl and amino groups. Metal poly(aspartates), such as sodium poly(aspartate), are known in the art as condensation polymers based on aspartic acid.

More typically, the polyamide is selected from the group of polyamide 6, polyamide 6,6, polyamide 6/66, poly(4-aminobutyric acid) (nylon 4), poly(7-aminoheptanoic acid) (nylon 7), poly(8-aminooctanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12), nylon 4,6, poly(hexamethylene sebacamide) (nylon 6,10), poly(heptamethylene pimelamide) (nylon 7,7), poly(octamethylene suberamide) (nylon 8,8), poly(hexamethylene azelamide) (nylon 6,9), poly(nonamethylene azelamide) (nylon 9,9), poly(decamethylene azelamide) (nylon 10,9), poly(tetramethylenediamine-co-oxalic acid) (nylon 4,2), the polyamide of n-dodecanedioic acid and hexamethylenediamine (nylon 6,12), the polyamide of dodecamethylenediamine and n-dodecanedioic acid (nylon 12,12), trimethylene adipamide/hexamethylene azelaiamide copolymer (nylon trimethyl 6,2/6,2), hexamethylene adipamide-hexamethylene-azelaiamide caprolactam copolymer (nylon 6,6/6,9/6), poly(tetramethylenediamine-co-isophthalic acid) (nylon 4,I), polyhexamethylene isophthalamide (nylon 6,I), hexamethylene adipamide/hexamethylene-isophthalamide (nylon 6,6/6I), hexamethylene adipamide/hexamethyleneterephthalamide (nylon 6,6/6T), poly(2,2,2-trimethylhexamethylene terephthalamide), poly(m-xylylene adipamide) (MXD6), poly(p-xylylene adipamide), poly(hexamethylene terephthalamide), poly(dodecamethylene terephthalamide), polyamide 6T/6I, polyamide 6/MXDT/I, polyamide MXDI, a terpolymer of lauryl lactam, isophthalic acid and bis(4-amino-3-methylcyclohexyl)methane and polynorbornamide, and combinations thereof. Even more typically, the polyamide is selected from the group of polyamide 6, polyamide 6,6, polyamide 6/66, and combinations thereof. Most typically, the polyamide is further defined as polyamide 6. Polyamide 6 is also known as polycaprolactam and is commercially available from BASF Corporation under the trade name Ultramid® B. Polyamide 6,6 is a copolymer of hexamethylene diamine and adipic acid and is commercially available from BASF Corporation under the trade name Ultramid® A. Polyamide 6/66 is a co-polymer of polyamide 6 and polyamide 66 and is commercially available from BASF Corporation under the trade name of Ultramid® C. Any one of these polyamides can be formed according to the instant invention and may have the reagent incorporated therein. The polyamide typically has a relative viscosity of from 2.1 to 4, as determined using ISO 307. However, in various embodiments, the polyamide has a relative viscosity of from 2.5 to 2.7, as determined using ISO 307.

As first introduced above, the polyamide has the reagent incorporated therein. The terminology "incorporated therein" is not limited to any particular chemical or physical definition so long as the polyamide is mixed or combined with the reagent. The polyamide may include a dispersion of the reagent in a homogeneous or heterogeneous mixture. Most typically, the reagent is homogeneously dispersed within the polyamide. Alternatively, the polyamide may include solutions, suspensions, emulsions, or colloidal dispersions of the reagent. Further, the polyamide may be further defined as a liquid/liquid, liquid/solid, solid/liquid, or solid/solid, mixture of the polyamide and the reagent. In one embodiment, the reagent is mixed or combined with the polyamide such that the reagent does not react with the polyamide. In another embodiment, the reagent interacts with the polyamide via hydrogen bonding, dipole-dipole interactions, Van der Waals forces, or coordination complexing. In still another embodiment, the reagent reacts with the polyamide and forms ionic and/or covalent bonds with the polyamide thereby becoming incorporated into the polyamide. In one embodiment, the reagent is reacted into the polyamide and is incorporated into a matrix or lattice of the polyamide. It is contemplated that the reagent may react with the polyamide and become incorporated into a middle or an end of the polyamide such that reagent becomes a pendant or terminal group of the polyamide, respectively. Alternatively, the reagent may become incorporated into both the middle and end of the polyamide such that the reagent becomes both a pendent and a terminal group of the polyamide.

The reagent may be any known in the art and may be further defined as an additive. The reagent in this invention may be a compound that reacts or simply interacts with other molecules, such as molecules of the polyamide. In some embodiments, the reagent of this invention is utilized in order to bring about a reaction or to see whether a reaction occurs or does not occur. For example, in one embodiment, the reagent is further defined as a stain blocking agent which reacts or interacts with at least one free acid site in the polyamide to minimize reactivity of the free acid site and increase stain resistance of products formed from the polyamide. In another embodiment, the reagent is selected from the group of impact modifiers, fillers, oxidative and thermal stabilizers, lubricants, release agents, flame-retarding agents, oxidation inhibitors, oxidation scavengers, neutralizers, antiblock agents, dyes, pigments and other coloring agents, ultraviolet light absorbers and stabilizers, reinforcing agents, nucleators, plasticizers, waxes, hot melt adhesives, processing aids, antistatic agents, nucleating agents, anti-microbials, melt viscosity enhancers, catalysts such as salts of hypophosphites including sodium hypophosphite, ammonium hypophosphite and manganese hypophosphite, salts of phosphorus-containing organic compounds such as phenylphosphinic acid, polyphosphoric acids and triphenyl phosphite, and combinations thereof. As described above, the reagent may be a stain blocking agent. Additionally, the polyamide may have at least one free acid site such that the reagent interacts with the at least one free acid site in the polyamide to minimize reactivity of the free acid site and increase stain resistance of products formed from the polyamide. The at least one free acid site typically includes free acid dye sites or basic sites in the polyamide (e.g. amine end groups and amide linkages) that react with acid staining compositions, also known as acid dyes. This reaction causes the polyamide, and products formed therefrom, to become stained by the acid staining composition. Typical acid staining compositions include, but are not limited to, food compositions such as coffee, teas, soft drinks, and fruit juices, chemical compositions such as iodines, inks, and the like, organic compositions such as grasses, dirt, and the like, and fluid compositions such as blood, sweat, and the like. In addition, at least a portion of the reagent interacts (e.g. reacts) with the at least one free acid site through a chemical reaction, through formation of an acid-salt compound, or through hydrogen bonding, dipole-dipole interactions, Van der Waals forces, or coordination complexing.

In one embodiment, the reagent has the following chemical formula:

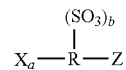

wherein X and Z are each independently defined as moieties that interact with the at least one free acid site of the polyamide, a is an integer of from 0 to 2, b is an integer of from 1 to 4, and R is aliphatic, aromatic, or alicyclic. In another embodiment, at least one of X and Z is further defined as a carboxylic acid moiety or salt thereof. In still another embodiment, both X and Z are further defined as carboxylic acid moieties or salt thereof. In further embodiments, X and/or Z are alkali metal, alkaline earth metal, or transition metal salts of carboxylic acids. In even further embodiments, X and/or Z are further defined as isocyanate groups, epoxy groups, ester groups, and/or α,β-diketone groups. Alternatively, X and Z may be combined to form carboxylic anhydride groups. In addition, R may be aliphatic, aromatic, alicyclic or heterocyclic and may be further defined as a phenyl, naphthyl, alkyl (straight or branched chain), cycloalkyl, aralkyl, alkenyl, or cycloalkenyl group or a substituted analog thereof.

In one embodiment, the reagent is selected from the group of sulfoisophthalic acids, sulfobenzoic acids, sulfonic acids, salts thereof, anhydrides thereof, and combinations thereof. In another embodiment, the reagent is selected from the group of 5-sulfoisophthalic acid, 3-sulfobenzoic acid, 4-(acetoacetamido)benzene sulfonic acid, 4-isocyanatobenzene sulfonic acid, 4-(2,3-epoxypropyl)-benzene sulfonic acid, dimethyl-5-sulfoisophthalate, 3,5-di-(2,3-epoxypropyl)benzene sulfonic acid, 3,5-di-isocyanatobenzene sulfonic acid, 3,5-di-(acetoacetamido)benzene sulfonic acid, sulfophthalic anhydride, salts thereof, and combinations thereof. For descriptive purposes only, chemical structures of some of these reagents are set forth below:

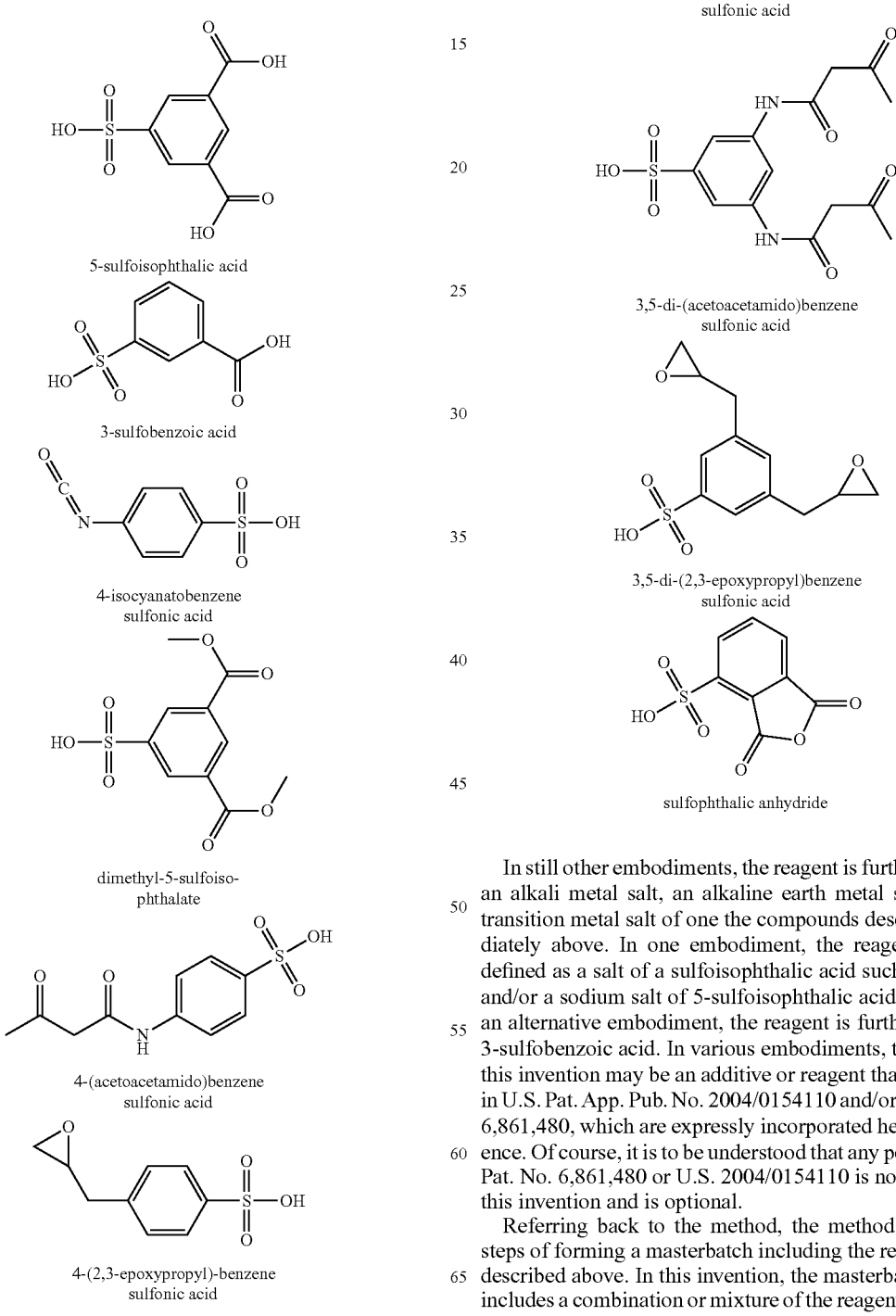

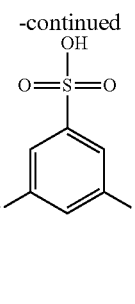

In still other embodiments, the reagent is further defined as an alkali metal salt, an alkaline earth metal salt, and/or a transition metal salt of one the compounds described immediately above. In one embodiment, the reagent is further defined as a salt of a sulfoisophthalic acid such as a lithium and/or a sodium salt of 5-sulfoisophthalic acid (LISIPA). In an alternative embodiment, the reagent is further defined as 3-sulfobenzoic acid. In various embodiments, the reagent of this invention may be an additive or reagent that is described in U.S. Pat. App. Pub. No. 2004/0154110 and/or U.S. Pat. No. 6,861,480, which are expressly incorporated herein by reference. Of course, it is to be understood that any portion of U.S. Pat. No. 6,861,480 or U.S. 2004/0154110 is not required for this invention and is optional.

Referring back to the method, the method includes the steps of forming a masterbatch including the reagent, as first described above. In this invention, the masterbatch typically includes a combination or mixture of the reagent and a carrier for use in forming the polyamide. The reagent is typically present in a lesser concentration than the carrier. The carrier is typically a compound that is compatible with the polyamide formed in this invention and that is present in a greater percent by weight that the reagent that is dispersed in the carrier. The carrier also typically allows the reagent to be easily handled and to be used to form the polyamide of this invention. In one embodiment, the terminology "masterbatch" is further defined as a concentrate of the reagent in the carrier. In another embodiment, the terminology "masterbatch" is further defined as a homogeneous mixture of the reagent in the carrier. In still another embodiment, the terminology "masterbatch" is further defined as a mixture including an increased concentration of the reagent in the carrier, wherein the mixture is later diluted with another compound, e.g. the polyamide of this invention, to reduce a concentration of the reagent. Typically, the step of forming is further defined as combining the reagent and the carrier in a desired weight ratio. The step of combining may be further defined as mixing, extruding, or any other type of mixing step known in the art. In various embodiments, the masterbatch may include compounds described in U.S. Pat. App. Pub. No. 2004/0154110 and/or U.S. Pat. No. 6,861,480, which are expressly incorporated herein by reference. Of course, it is to be understood that any portion of U.S. Pat. No. 6,861,480 or U.S. Pat. App. Pub. No. 2004/0154110 is not required for this invention and is optional.

The masterbatch of this invention may include any ratio of the reagent to the carrier, such that the reagent and the carrier may be present in the masterbatch in any amount as desired by one of skill in the art. In one embodiment, the reagent is present in an amount of up to about 50 parts by weight per 100 parts by weight of the masterbatch. In other embodiments, the reagent is present in amounts of from 1 to 50, from 25 to 50, from 1 to 25, from 1 to 20, from 1 to 15, from 1 to 10, or from 1 to 5, parts by weight per 100 parts by weight of the masterbatch. In still other embodiments, the reagent is present in amounts of about 1, 2, 3, or 4 parts by weight per 100 parts by weight of the masterbatch. The masterbatch may include the reagent and the carrier, consist essentially of the reagent and the carrier, or consist of the reagent and the carrier. The terminology "consist essentially of" refers to the masterbatch including the reagent and the carrier but not any other compounds that would materially affect the basic and novel characteristics of the masterbatch, such as additional polymers.

The carrier may be any compound or mixture of compounds known in the art and is typically chemically and/or physically compatible with the polyamide. Typically, the masterbatch including the reagent, and optionally the carrier, has a similar melt viscosity as the polyamide formed in this invention for equivalent relative solution viscosities. This similarity allows the masterbatch and reagent to melt with the polyamide being formed which leads to maximized homogenous incorporation of the reagent in the polyamide, tends to maximize an extent of polymerization (i.e., amounts and rates of polymerization) that can occur in the polyamide reactors, tends to maximize rates of polyamide discharge from the reactors, and tends to reduce excessive foaming in the reactors thereby avoiding problems associated with poor agitation and non-uniformity of the polyamide. Use of the masterbatch also tends to reduce issues associated with the hydroscopicity and agglomeration of the many reagents (e.g. stain blocking agents), issues associated with inconsistent and non-homogenous addition to, and incorporation into, the polyamide, and issues associated with clogging of supply pipes. Said differently, use of the masterbatch eases handling and processing issues associated with traditionally hard-to-handle reagents.

The carrier is typically selected from the group of polyesters, modified polyolefins, polyamides, and combinations thereof. In one embodiment, the carrier is the same as the polyamide formed from the instant method. For example, the carrier and the polyamide formed in this invention may both be polyamide 6, polyamide 6/6, etc. In another embodiment, the carrier is a polyamide but is different from the polyamide formed from the instant method. In still another embodiment, the carrier is further defined as polyamide 6. The carrier may include a mixture of polyamides. In one embodiment, the carrier is further defined as a thermoplastic carrier. In another embodiment, the carrier is a plastic. In still another embodiment, the carrier is selected from the group of nylon 6, nylon 6/6, polyesters, olefins, and combinations thereof. In various other embodiments, the carrier includes one or more of a terpolymer of ethylene or mixtures of ethylene with higher alpha-olefins, an acrylic, methacrylic acid or glycidyl ester, maleic anhydride, and combinations thereof. In one embodiment, the carrier is further defined as a semi-crystalline thermoplastic polyester including, but not limited to, poly(butylene terephthalate), poly(trimethylene terephthalate), poly (ethylene terephthalate-co-isophthalate), and combinations thereof. Typically, the carrier is not a liquid.

In various embodiments, the masterbatch has relative solution viscosity of from 2 to 4.5, of from 2.2 to 3, or of from 2.2 to 2.3. Without intending to be bound by any particular theory, it is believed that many benefits of this invention are associated with similarities in the melt viscosity of the polyamide and the melt viscosity of the masterbatch based upon equivalent relative solution viscosities for both the polyamide and the masterbatch.

The method also includes the step of introducing the masterbatch into a reactor. The masterbatch may be introduced into the reactor by any mechanism known in the art including in a continuous mode or in a batch mode. Typically, the masterbatch is introduced into the reactor in a continuous mode. The masterbatch may be introduced into the reactor as a solid, a gas, a gel, a gum, a paste, a dispersion, or as a powder. Typically, the masterbatch is introduced into the reactor as a solid or paste and most typically as a solid. It is contemplated that the paste may include water or may be free from water. The paste may be oligomeric. In one embodiment, the masterbatch is introduced into a top of the reactor such that the reagent can move downwards in the reactor and become incorporated into the polyamide that is forming from the polymerization of the monomer of this invention. In another embodiment, the masterbatch is introduced into a side of the reactor also so that the reagent can move downwards and become incorporated into the polyamide.

In addition to introducing the masterbatch into the reactor, the method also includes the step of introducing the monomer into the reactor. The masterbatch and the monomer may be introduced into the reactor simultaneously or sequentially. The masterbatch may be combined with the monomer before introduction into the reactor. Alternatively, the masterbatch and the monomer may be introduced into the reactor separately. Like the masterbatch, the monomer may be introduced into the reactor in a continuous or batch mode. Typically, the monomer is introduced into the reactor in a continuous mode. In addition, the monomer may be introduced into the reactor as a solid, a liquid, a gas, a gel, a gum, a paste, a dispersion, or as a powder. Typically, the monomer is introduced into the reactor as a liquid. In one embodiment, the monomer is introduced into a top of the reactor such that the monomer can move downwards in the reactor and polymerize to form the polyamide of this invention. In another embodiment, the monomer is introduced into a side of the reactor also so that the monomer can move downwards and polymerize. Most typically, the masterbatch and the monomer are simultaneously introduced into a top of the reactor in a continuous mode from different sources. That is, the masterbatch and the monomer are not typically combined prior to introduction into the reactor. Alternatively, the masterbatch and the monomer may be premixed and introduced into the reactor simultaneously. In other embodiments, the masterbatch and the monomer are introduced into the reactor sequentially with either the masterbatch or the monomer introduced first.

The reactor of this method may be any known in the art but typically is further defined as a VK (Vereinfacht Kontinuierlich) tube reactor (i.e., a simplified continuous tube reactor). Typically, VK tube reactors include a vertical tube operated at atmospheric pressure wherein heating and prepolymerization take place in an upper part and the polyamide is formed in a lower part. Alternatively, the reactor may be further defined as an AKU (Algemene Kunstzijde Unie) reactor. It is also contemplated that the reactor may be a batch reactor. In one embodiment, the reactor is further defined as the VK tube reactor and the steps of introducing the masterbatch and the monomer are further defined as introducing each into the top of the VK tube reactor. Of course, the instant invention is not limited to any particular type of reactor.

In addition, the method includes the step of forming the polyamide in the reactor by polymerizing the monomer in the presence of the reagent. The step of forming the polyamide is typically further defined as heating the monomer to a temperature of from 230 to 300, more typically of from 240 to 290, and most typically of from 260 to 270° C., to cause the monomer to polymerize and form the polyamide. The step of forming the polyamide in the reactor typically occurs in a time of from 4 to 24, more typically in a time of from 8 to 24, still more typically in a time of from 10 to 18, and most typically in a time of from 12 to 14, hours. In one embodiment, the step of forming is further defined as forming the polyamide in the reactor in a time of at least 8 hours.

In one embodiment, the monomer is further defined as caprolactam and the step of forming the polyamide proceeds by the following reaction:

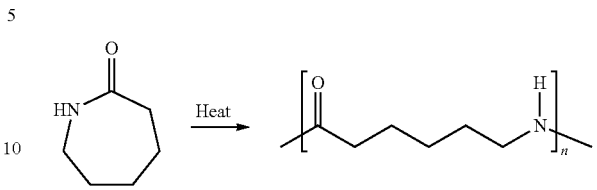

wherein n is a number greater than one. In another embodiment, the monomer is further defined as a mixture of hexamethylene diamine and adipic acid and the step of forming the polyamide proceeds by the following reaction:

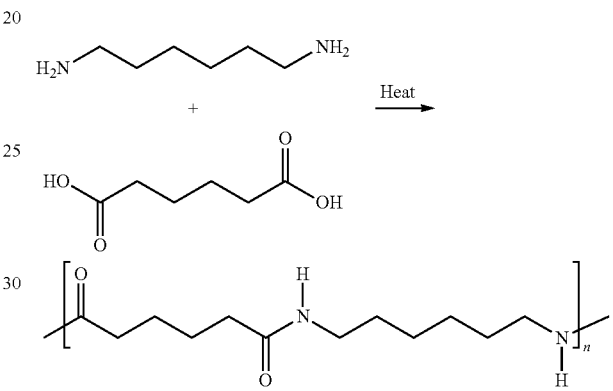

wherein n is a number greater than one. In yet another embodiment, the monomer is further defined as a mixture of caprolactam, hexamethylene diamine, and adipic acid and the step of forming the polyamide proceeds by the following reaction:

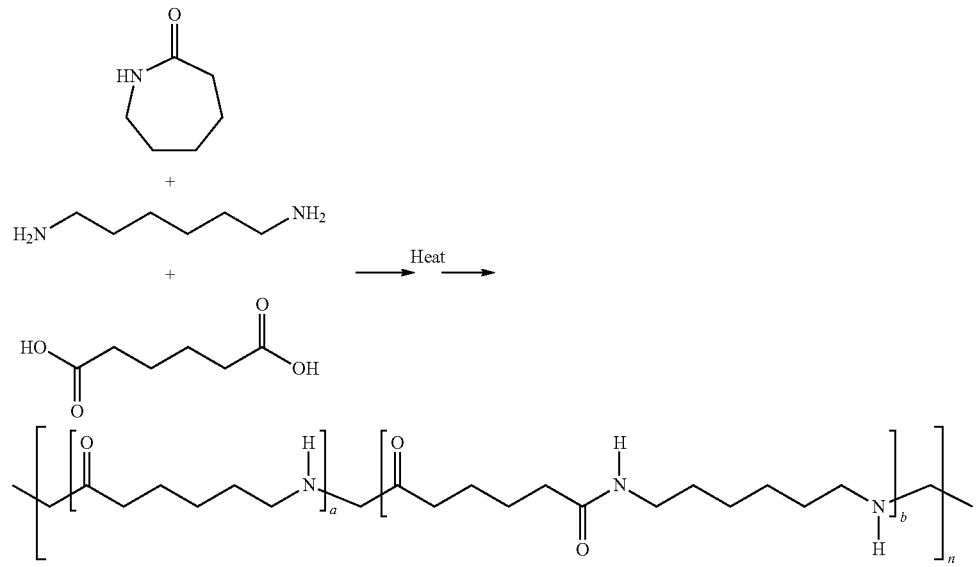

wherein a, b, and n are all independently defined as numbers greater than one.

In an alternative embodiment, the method also includes the step of adding an additional reagent to the polyamide. The additional reagent may be the same or different from the reagent described above, but is typically different. The additional reagent may be added to the polyamide by any method described in U.S. Pat. No. 6,861,480 or any of its related family members, the disclosures of which are expressly incorporated herein by reference.

The method may also include the step of forming a fiber from the polyamide. It is also contemplated that, in various embodiments, the method may also include one or more steps as described in U.S. Pat. No. 6,861,480 or U.S. Pat. App. Pub. No. 2004/0154110, each of which is expressly incorporated herein by reference. Of course, it is to be understood that any portion of U.S. Pat. No. 6,861,480 or U.S. Pat. App. Pub. No. 2004/0154110 is not required for this invention and is optional.

The instant invention also provides the polyamide itself that is formed from this invention and an article, such as a fiber, formed from the polyamide. The polyamide may be a solid, a liquid, or a mixture of solids and liquids. Typically, the polyamide is a solid pellet. The article may be any known in the art. In one embodiment, the article is further defined as a textile which may be any known in the art including, but not limited to fibers, yarns, carpets, rugs, clothing, containers, upholstered furnishings, window shades, towels, table coverings, beds, filters, flags, backpacks, tents, nets, cleaning devices, balloons, kites, sails, and parachutes. Alternatively, the fibers may be used to strengthen materials such as fiberglass and industrial geotextiles. Most typically, the fibers are formed into carpeting and/or rugs.

EXAMPLES

A series of polyamides, comparative polyamides, and a control polyamide are formed and evaluated to determine relative viscosity (RV), a number of amino end groups, and an ability to resist staining. The methods used to form these polyamides and the results of the evaluations are described in detail below.

Formation of Polyamide 1

A first polyamide (Polyamide 1) is formed according to the instant invention and is known in the art as polyamide 6. More specifically, about 1055 grams of a masterbatch (Masterbatch 1) is formed by combining about 9 grams of the lithium salt of 5-sulfoisophthalic acid (LiSIPA) as the reagent to about 1046 grams of polyamide 6 as the carrier at a temperature of about 100° C. to form a 0.85 wt % masterbatch. Subsequently, the 1055 grams of Masterbatch 1 is introduced into the top of a VK tube reactor along with about 21945 grams of caprolactam monomer. The caprolactam monomer and the Masterbatch 1 are introduced into the top of the VK tube reactor simultaneously but from separate sources. That is, the caprolactam monomer and the Masterbatch 1 are not mixed or combined prior to their introduction into the top of the VK tube reactor. The Polyamide 1 is formed in the reactor by polymerizing the caprolactam monomer in the presence of the reagent.

Formation of Polyamide 2

A second polyamide (Polyamide 2) is formed as described above. However, about 1667 grams of a masterbatch (Masterbatch 2) is formed by combining about 22 grams of LiSIPA as the reagent to about 1645 grams of polyamide 6 as the carrier at a temperature of about 100° C. to form a 1.33 wt % masterbatch. Subsequently, the 1667 grams of Masterbatch 2 is introduced into the top of a VK tube reactor along with about 22436 grams of caprolactam monomer and about 0.48 wt % of hexamethylene diamine (HMD) based on the caprolactam, to form the Polyamide 2.

Formation of Comparative Polyamide 1

A first comparative polyamide (Comparative Polyamide 1; polyamide 6) is not formed according to the instant invention. Said differently, Comparative Polyamide 1 is not formed using a masterbatch but still includes an amount of LiSIPA. More specifically, about 208 grams of powdered LiSIPA is introduced into the top of a VK tube reactor along with about 22792 grams of caprolactam monomer and about 0.48 wt % of HMD based on the caprolactam monomer. The caprolactam monomer and the LiSIPA are introduced into the top of the VK tube reactor simultaneously but from separate sources. That is, the caprolactam monomer and the LiSIPA are not mixed or combined prior to their introduction into the top of the VK tube reactor. The Comparative Polyamide 1 is formed in the reactor by polymerizing the caprolactam monomer in the presence of the LiSIPA.

Formation of Comparative Polyamide 2

A second comparative polyamide (Comparative Polyamide 2; polyamide 6) is formed in the same way as Comparative Polyamide 1. However, about 326 grams of powdered LiSIPA is introduced into the top of a VK tube reactor along with about 22436 grams of caprolactam monomer and about 0.48 wt % of HMD based on the caprolactam.

Formation of Control Polyamide:

A Control Polyamide (polyamide 6) is also formed in the same way as Comparative Polyamide 1. However, no LiSIPA is used.

Evaluation of Polyamides:

As described above, each of the Polyamides 1 and 2, the Comparative Polyamides 1 and 2, and the Control Polyamide are evaluated to determine relative viscosity (RV), a number of amino end groups, and an ability to resist staining. Relative Viscosity is determined using ISO-301 both (1) immediately after formation prior to drying and extraction ("Relative Viscosity 1") and (2) after extraction and post-condensation ("Relative Viscosity 2"). The number of amino end groups is determined using ASTM ISO9702:1996. The ability to resist staining is determined using a FD&C Red 40 dye solution staining test. The results of each of these evaluations are set forth in Table 1 below.

TABLE 1

|  | Polyamide 1 | Polyamide 2 | Comparative Polyamide 1 | Comparative Polyamide 2 | Control Polyamide |
|---|---|---|---|---|---|
| Relative Viscosity (1) | 2.257 | 2.250 | 2.115 | 2.170 | 2.60 |
| Relative Viscosity (2) | 2.400 | 2.690 | 2.360 | 2.630 | 2.60 |
| Amino End Groups (meq/kg) | 11.1 | 46 | 23.5 | 46 | 36 |

Analysis of Polyamides 1 and 2 and Comparative Polyamides 1 and 2:

After formation, samples of the Polyamides 1 and 2, the Comparative Polyamides 1 and 2, and the Control Polyamide are knitted into socks (Socks 1 and 2, Comparative Socks 1 and 2, and Control Sock 1).

To evaluate stain resistance, each of the Socks is exposed to FD&C Red 40 dye and then washed. FD&C Red 40 dye is very common and is present in the soft drink cherry-flavored Kool-Aid® commercially available from Kraft General Foods, Inc.

More specifically, a FD&C Red 40 dye solution of 0.1 grams FD&C Red 40 dye in 1000 ml of water is prepared. The solution has a pH adjusted to a range of 2.80 to 2.90 using citric acid. After formation of the solution, 1.0 grams of each of the Socks is wet in 50 mL of the solution. The solution is then stirred briefly and allowed to stand for one hour. Each Sock is then washed with a continuous flow of warm water (40° C.-50° C.) for 2 minutes and then allowed to dry for approximately 16 hours. Subsequently, each Sock is visually evaluated to determine a level of stain resistance. The results of the visual evaluation are set forth in Table 2 below.

TABLE 2

| | Poly-amide 1 | Poly-amide 2 | Comparative Polyamide 1 | Comparative Polyamide 2 | Control Polyamide |
|---|---|---|---|---|---|
| Stain Resistance | Best | Third Best | Fourth Best | Second Best | Worst |

The results of this visual evaluation suggest that the use of the masterbatch of this invention produces Socks that have the best level of stain resistance. Notably, the Comparative Polyamide 2 scores second best in the visual evaluation which is better than the Polyamide 2 of this invention. Without intending to be bound by any particular theory, this result is believed to originate from small scale reactions. In larger scale reactions, the Polyamide 2 of this invention will score better than the Comparative Polyamide 2.

Alternatively, the amount of staining may be visually compared to an AATCC color scale commercially available from American Association of Textile Chemists and Colorists (AATCC) of Research Triangle Park, N.C. The AATC color scale includes ten film squares that are colored with gradually increasing strengths of FD&C Red 40 dye and that are numbered from 1 to 10, with 1 being the strongest color and 10 being colorless.

If using this method, unstained areas of the Socks may be placed underneath the colored portions of the scale and stained areas of the Socks may placed underneath the colorless portions of the scale and viewed under daylight or its equivalent. The light is incident upon the surfaces of the scales and the Socks at an angle of 45°±5° and a viewing direction should be 90°±5° to a plane of the surfaces. If the color of the stained Socks falls between two squares on the scale, then half grades are used. The number of the colored square is called the Stain Rating.

It is to be understood that any of the numerical values associated with this invention, e.g. molecular weight ranges, ratios, etc., are not particularly limiting and may vary, so long as they vary in a way consistent with the scope of this invention. For example, any of the aforementioned numerical values may be further defined as any value or range of values, both whole and fractional, within those ranges and values described above and/or may vary from the values and/or range of values described above by ±5%, ±10%, ±15%, ±20%, ±25%, ±30%, etc.

It is also to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is further to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A method of polymerizing a monomer to form a polyamide having a reagent incorporated therein, said method comprising the steps of:
   A. forming a masterbatch comprising the reagent and a thermoplastic carrier;
   B. introducing the masterbatch into a reactor;
   C. introducing the monomer into the reactor; and
   D. forming the polyamide in the reactor by polymerizing the monomer in the presence of the reagent.

2. A method as set forth in claim 1 wherein the step of forming the polyamide is further defined as forming the polyamide in the reactor in a time of at least 8 hours.

3. A method as set forth in claim 1 wherein the polyamide is selected from the group of polyamide 6, polyamide 6/6, polyamide 6/66, and combinations thereof.

4. A method as set forth in claim 1 wherein the monomer is further defined as caprolactam and the polyamide is further defined as polyamide 6.

5. A method as set forth in claim 1 wherein the polyamide has at least one free acid site and the reagent associates with the at least one free acid site to minimize reactivity of the at least one free acid site.

6. A method as set forth in claim 5 wherein the reagent has the following chemical formula:

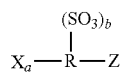

wherein each of X and Z is independently defined as moieties that associate with the at least one free acid site of the polyamide, wherein a is an integer of from 0 to 2, b is an integer of from 1 to 4, and R is an aliphatic, aromatic, or alicyclic moiety.

7. A method as set forth in claim 6 wherein at least one of X and Z is further defined as a carboxylic acid moiety.

8. A method as set forth in claim 5 wherein the reagent is selected from the group of sulfoisophthalic acids, sulfobenzoic acids, sulfonic acids, salts thereof, anhydrides thereof, and combinations thereof.

9. A method as set forth in claim 5 wherein the reagent is further defined as a salt of a sulfoisophthalic acid.

10. A method as set forth in claim 9 wherein the salt of the sulfoisophthalic acid is further defined as a lithium salt of 5-sulfoisophthalic acid.

11. A method as set forth in claim 8 wherein the reagent is further defined as 3-sulfobenzoic acid.

12. A method as set forth in claim 1 wherein the reactor is further defined as a VK tube reactor, the polyamide is further defined as polyamide 6, the step of introducing the masterbatch is further defined as introducing the masterbatch into a top of the VK tube reactor, the step of introducing the monomer is further defined as introducing the monomer into the top of the VK tube reactor, and wherein the steps of introducing the masterbatch and the monomer occur simultaneously.

13. A method as set forth in claim 1 wherein the reactor is further defined as a VK tube reactor, the polyamide is further defined as polyamide 6, the step of introducing the masterbatch is further defined as introducing the masterbatch into a top of the VK tube reactor, the step of introducing the monomer is further defined as introducing the monomer into the top of the VK tube reactor, and wherein the steps of introducing the masterbatch and the monomer occur sequentially.

14. A method as set forth in claim 1 wherein the steps of introducing the masterbatch and the monomer into the reactor occur sequentially.

15. A method as set forth in claim 1 wherein the steps of introducing the masterbatch and the monomer into the reactor occur simultaneously.

16. A method as set forth in claim 1 wherein the masterbatch further comprises a carrier selected from the group of polyamide 6, polyamide 6/6, polyamide 6/66, and combinations thereof.

17. A method as set forth in claim 16 wherein the carrier is further defined as polyamide 6.

18. A method as set forth in claim 1 wherein the reagent is present in an amount of from 1 to 10 parts by weight per 100 parts by weight of the masterbatch.

19. A method as set forth in claim 1 wherein the masterbatch consists essentially of the reagent and a carrier and the reagent is present in an amount of from 1 to 10 parts by weight per 100 parts by weight of the masterbatch.

20. A method as set forth in claim 1 wherein the reagent reacts with the polyamide to form a covalent bond and become incorporated into the polyamide.

21. A method as set forth in claim 1 further comprising the step of forming a fiber from the polyamide.

22. A method of polymerizing a caprolactam monomer in a VK tube reactor to form polyamide 6 having at least one free acid site, said method comprising the steps of:
A. forming a masterbatch comprising a reagent and polyamide 6, wherein the reagent is present in an amount of from 1 to 10 parts by weight per 100 parts by weight of the masterbatch, and the reagent has the following chemical formula:

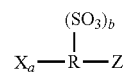

wherein X and Z are each independently defined as moieties that associate with the at least one free acid site of the polyamide 6, a is an integer of from 0 to 2, b is an integer of from 1 to 4, and R is aliphatic, aromatic, or alicyclic;
B. introducing the masterbatch into a top of the VK tube reactor;
C. introducing the caprolactam monomer into the top the VK tube reactor; and
D. polymerizing the caprolactam monomer in the VK tube reactor and in the presence of the reagent to form the polyamide 6 in a time of at least 8 hours.

23. A method as set forth in claim 22 wherein the steps of introducing the masterbatch and the caprolactam monomer occur simultaneously.

24. A method as set forth in claim 22 wherein the steps of introducing the masterbatch and the caprolactam monomer occur sequentially.

25. A method of polymerizing a caprolactam monomer in a VK tube reactor to form polyamide 6, said method comprising the steps of:
A. forming a masterbatch comprising a reagent and polyamide 6, wherein the reagent is present in an amount of from 1 to 10 parts by weight per 100 parts by weight of the masterbatch, and the reagent is selected from the group of sulfoisophthalic acids, sulfobenzoic acids, sulfonic acids, salts thereof, anhydrides thereof, and combinations thereof;
B. simultaneously introducing the masterbatch and the caprolactam into a top of the VK tube reactor; and
C. polymerizing the caprolactam in the VK tube reactor and in the presence of the reagent to form polyamide 6 in a time of at least 8 hours.

* * * * *